United States Patent
Yamamoto et al.

(10) Patent No.: US 9,413,975 B2
(45) Date of Patent: Aug. 9, 2016

(54) IMAGE CAPTURING APPARATUS AND CONTROL METHOD

(75) Inventors: Yuji Yamamoto, Kasukabe (JP); Kazunori Gouji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/445,721

(22) Filed: Apr. 12, 2012

(65) Prior Publication Data

US 2012/0269501 A1    Oct. 25, 2012

(30) Foreign Application Priority Data

Apr. 19, 2011    (JP) .................................. 2011-093241

(51) Int. Cl.
   *H04N 5/235*    (2006.01)

(52) U.S. Cl.
   CPC .................................. *H04N 5/2353* (2013.01)

(58) Field of Classification Search
   USPC ......................................................... 396/238
   See application file for complete search history.

(56) References Cited

U.S. PATENT DOCUMENTS

| | | | | |
|---|---|---|---|---|
| 4,286,849 A * | 9/1981 | Uchidoi et al. | ............... | 396/239 |
| 4,525,054 A * | 6/1985 | Someya et al. | ............... | 396/243 |
| 5,274,421 A * | 12/1993 | Takahashi | ....................... | 355/69 |
| 5,521,671 A * | 5/1996 | Aoki et al. | ..................... | 396/281 |
| 5,794,086 A * | 8/1998 | Wakabayashi et al. | ........ | 396/284 |
| 5,913,086 A * | 6/1999 | Kawamura et al. | ............ | 396/223 |
| 7,433,592 B2 * | 10/2008 | Ito et al. | ......................... | 396/284 |
| 7,561,201 B2 * | 7/2009 | Hong | ................. | H04N 5/23293 348/333.01 |
| 7,889,246 B2 * | 2/2011 | Fujio | ....................... | G03B 7/003 348/229.1 |
| 8,350,945 B2 * | 1/2013 | Yumiki | .................... | 348/333.02 |
| 2003/0067551 A1 * | 4/2003 | Venturino et al. | ............ | 348/364 |
| 2003/0175022 A1 * | 9/2003 | Ueyama | .......................... | 396/89 |
| 2003/0223002 A1 * | 12/2003 | Minami et al. | ................ | 348/275 |
| 2006/0007322 A1 * | 1/2006 | Nakamura et al. | ......... | 348/222.1 |
| 2008/0062284 A1 | 3/2008 | Fujio et al. | | |
| 2008/0309792 A1 | 12/2008 | Takagi et al. | | |
| 2010/0214429 A1 * | 8/2010 | Usui et al. | .................. | 348/222.1 |
| 2010/0214440 A1 * | 8/2010 | Hirose | ........................ | 348/229.1 |
| 2010/0309332 A1 * | 12/2010 | Ueda et al. | ................. | 348/229.1 |
| 2011/0064399 A1 * | 3/2011 | Tohyama | ....................... | 396/242 |
| 2011/0221930 A1 * | 9/2011 | Katsumata | ................ | 348/226.1 |
| 2011/0304746 A1 * | 12/2011 | Iijima et al. | ................ | 348/229.1 |

FOREIGN PATENT DOCUMENTS

| | | |
|---|---|---|
| CN | 1239857 A | 12/1999 |
| CN | 101405783 A | 4/2009 |
| JP | 2006-222757 A | 8/2006 |

* cited by examiner

*Primary Examiner* — Clayton E Laballe
*Assistant Examiner* — Linda B Smith
(74) *Attorney, Agent, or Firm* — Canon USA, Inc. I.P. Division (57) ABSTRACT

If an exposure control value set according to a user's instruction is out of an exposure control value control range set according to a user's instruction, the exposure control value control range is changed to a range including the exposure control value set according to the user's instruction.

10 Claims, 8 Drawing Sheets

IMAGE CAPTURING APPARATUS AND CONTROL METHOD

BACKGROUND OF THE INVENTION

1. Field of the Invention

The present invention relates to an image capturing apparatus capable of automatically setting an exposure control value and a control method thereof.

2. Description of the Related Art

Conventionally, regarding the ISO sensitivity (imaging sensitivity) of a camera, a function, which when no appropriate exposure can be obtained under an ISO sensitivity set according to a user's instruction, of automatically changing the ISO sensitivity to obtain the appropriate exposure (referred to as automatic sensitivity change function) has been known. Japanese Patent Application Laid-Open No. 2006-222757 discusses an electronic camera capable of changing a set imaging sensitivity when appropriate exposure is not obtained in exposure calculation. The electronic camera can set a control upper limit sensitivity and a control lower limit sensitivity when changing the imaging sensitivity so as not to exceed a range which the user intends.

However, according to Japanese Patent Application Laid-Open No. 2006-222757, the user can input an instruction about the imaging sensitivity only in a range between the control upper limit sensitivity and the control lower limit sensitivity (in a sensitivity control range). Thus, the imaging sensitivity which can be set according to the user's instruction is limited to a particular range and there may be a case where the user cannot set the imaging sensitivity as he or she intends.

In such a case, the range of the imaging sensitivity can be expanded by changing the control upper limit sensitivity or the control lower limit sensitivity. However, the user needs to give an instruction for changing the control upper limit sensitivity or the control lower limit sensitivity, so that his or her intended imaging sensitivity cannot be set immediately. Such an issue may occur also when a technique discussed in Japanese Patent Application Laid-Open No. 2006-222757 is applied to exposure control values other than the imaging sensitivity, for example, an aperture value and a shutter speed.

SUMMARY OF THE INVENTION

According to an aspect of the present invention, an image capturing apparatus includes an image capturing unit configured to capture an image of an object, a light metering unit configured to perform light metering on the object, an exposure control value setting unit configured to set an exposure control value according to a user's instruction, an exposure control value changing unit configured to change an exposure control value to be set by the exposure control value setting unit based on a result of the light metering by the light metering unit, a control range setting unit configured, if the exposure control value changing unit changes the exposure control value set by the exposure control value setting unit, to set an exposure control value control range, and a control range changing unit configured, if the exposure control value set by the exposure control value setting unit is out of the exposure control value control range set by the control range setting unit, to change the exposure control value control range set by the control range setting unit into a range including the exposure control value set by the exposure control value setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
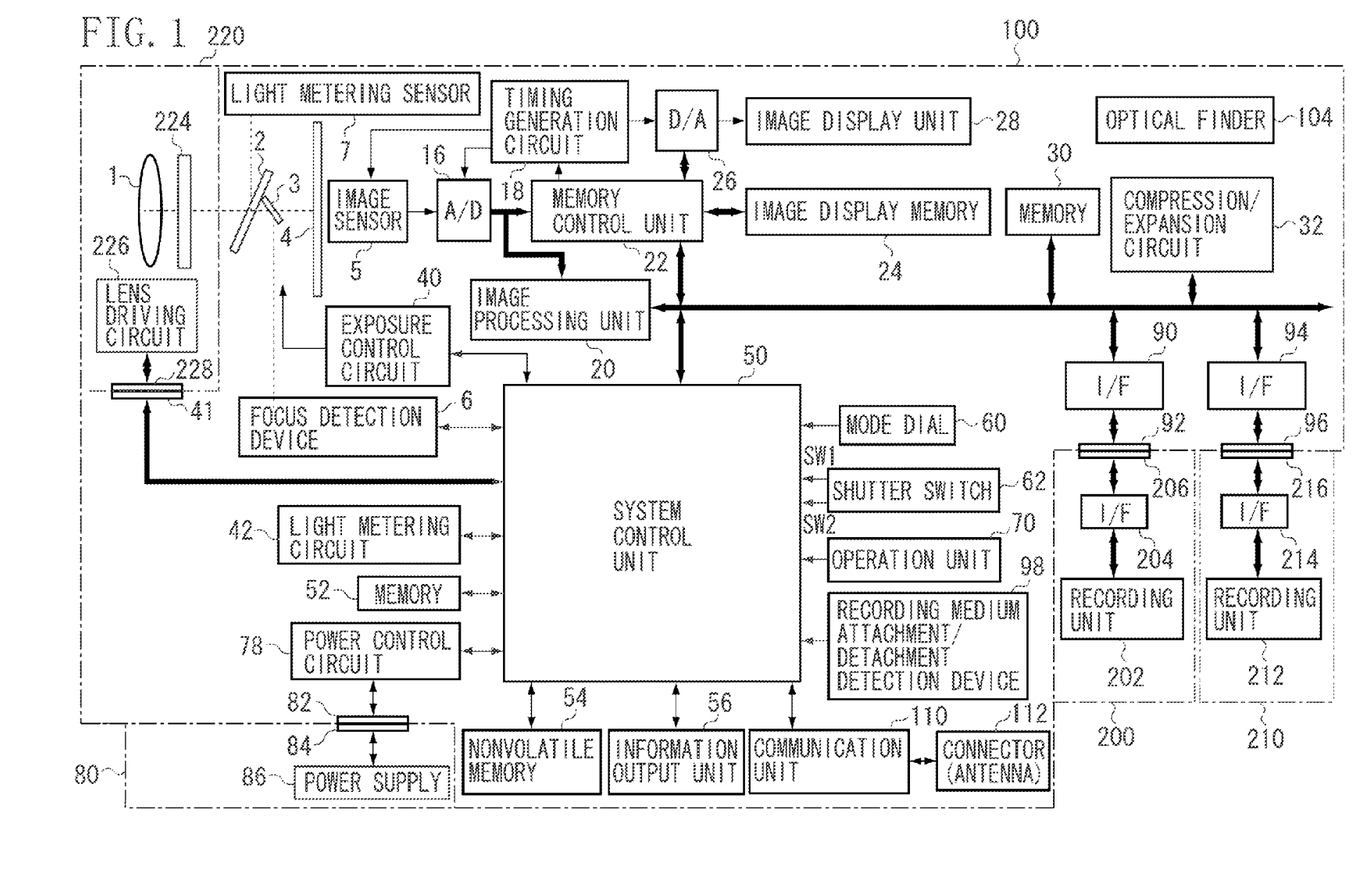
FIG. 1 illustrates a configuration of an image capturing apparatus according to an exemplary embodiment of the present invention.

FIG. 1 illustrates a configuration of a camera serving as an image capturing apparatus according to an exemplary embodiment of the present invention. A camera main body 100 is loaded with a shooting lens 220 which is detachable with respect to the camera main body 100.

In the camera main body 100, a main mirror 2 is inclined with respect to a photographic optical path when it is in an observation state and movable freely up to a retracted position when it is in an imaging state. A sub-mirror 3 is disposed obliquely with respect to the photographic optical path, reflects light flux transmitted through the main mirror 2 in a downward direction of the camera main body 100, and introduces the reflected light flux to a focus detection device 6.

A shutter 4 can move freely to advance to and retract from the photographic optical path and control exposure time of an image sensor 5. The image sensor 5 may include a charge coupled device (CCD) sensor, a complementary metal oxide semiconductor (CMOS) sensor, or the like, and photoelectrically converts an optical image of an object focused through a shooting lens 220. A light metering sensor 7 receives a part of the light flux reflected by the main mirror 2 and outputs information about luminance of the object to a metering light circuit 42.

An analog-to-digital (A/D) converter 16 converts an analog image signal from the image sensor 5 to a digital image signal. The imaging sensitivity can be changed by changing the detection sensitivity of signal charges accumulated in the image sensor 5 or an application gain of an amplification circuit (not illustrated), and is controlled by a system control unit 50. A timing generation circuit 18 supplies a clock signal to the image sensor 5, the A/D converter 16 and a D/A converter 26. The timing generation circuit 18 is controlled by a memory control circuit 22 and the system control unit 50.

An image processing circuit 20 executes various types of image processing such as pixel interpolation processing, color conversion processing, auto-white balance (AWB) processing on digital image signals transmitted from the A/D converter 16 or the memory control circuit 22, and generates image signals. The focus detection device 6 includes a phase difference detection sensor having a plurality focus detection areas.

The system control unit 50 executes accumulation control and reading control of the focus detection device 6 to calculate a defocus amount, which is information concerning a distance to the object, according to a known phase difference detection method. The system control unit 50 also controls focus driving and diaphragm driving of the shooting lens 220 based on an entire operation of the camera main body 100 and the defocus amount. Further, the system control unit 50 has a storage control function and a display control function (not illustrated).

The memory control circuit 22 controls the A/D converter 16, the timing generation circuit 18, the image processing circuit 20, the image display memory 24, the D/A converter 26, a memory 30 and a compression/expansion circuit 32.

An image signal from the image processing circuit 20 or a digital image signal from the A/D converter 16 is transmitted to the image display memory 24, the memory 30, and the system control unit 50 via the memory control circuit 22.

An image display unit 28 may be constituted of a liquid crystal display (LCD), a thin film transistor (TFT), or the like. Display image data written into the image display memory 24 and image data for a setting menu of the camera are transmitted to the image display unit 28 via the D/A converter 26, and displayed on the image display unit 28. The memory 30 stores generated still images. Further, the memory 30 is used as a work area of the system control unit 50.

The compression/expansion circuit 32 compresses or expands image data by adaptive discrete cosine transform (ADCT). The compression/expansion circuit 32 reads image data stored in the memory 30 and compresses or expands the image data, and writes back the processed image data into the memory 30.

An exposure control circuit 40 controls the shutter 4, and via the system control unit 50, controls a diaphragm 224 of the shooting lens 220. The metering light circuit 42 outputs information output from the light metering sensor 7 to the system control unit 50.

A memory 52 stores constants, variables, computer programs, and other data for operations of the system control unit 50. A nonvolatile memory 54 is a memory capable of electrically erasing and recording data. As the nonvolatile memory 54, an electrically erasable and programmable read only memory (EEPROM) or the like is used.

An information output unit 56 outputs information about an operating condition of the camera main body 100 and messages using characters, images, sound and the like. The information output unit 56 is constituted of a liquid crystal device, a speaker or the like.

A mode dial 60 is an operation member for changing an image capturing mode (i.e., manual mode, aperture priority mode, shutter speed priority mode, program mode, etc.). A shutter switch 62 includes an imaging preparation switch (SW1) and an imaging start switch (SW2). A first stroke operation (half-pressing) of a shutter button (not illustrated) turns ON the imaging preparation switch (SW1) to start an imaging preparation operation such as metering of light (automatic exposure (AE) processing) and automatic focus (AF) processing. Then, a second stroke operation (full pressing) of the shutter button turns ON the imaging start switch (SW2) to start the imaging operation.

The imaging operation involves driving of the diaphragm 224, movement of the shutter 4, an operation of generating an image signal with the image processing circuit 20 based on an image signal transmitted from the image sensor 5, and an operation of writing an image signal into the memory 30 via the memory control circuit 22. Additionally, an operation of reading image data from the memory 30, compressing the data with the compression/expansion circuit 32, and recording into recording media 200 and 210 is included in the imaging operation. The series of the imaging operations is also referred to as a recording image acquisition operation.

The recording media 200 and 201 are constituted of a semiconductor memory, an optical disk, or the like. An operation unit 70 includes various buttons and a touch panel and is operated when a function of the camera main body 100 is selected or a menu item for executing various settings is determined.

A power control circuit 78 includes a battery detection circuit configured to detect a remaining battery capacity, a direct current (DC)-DC converter configured to convert a power supply voltage from a battery to a predetermined operating voltage, and a switch circuit configured to change a powered block. A battery 80 is detachable from the camera main body 100. As a power supply 86 in the battery 80, a primary battery such as an alkaline battery, a lithium battery and a secondary battery such as a NiMH battery, Li battery can be used. Connectors 82 and 84 electrically connect the power supply 86 to the camera main body 100.

Interfaces 90 and 94 communicate with the recording media 200 and 210, respectively. Connectors 92 and 96 are connected to the recording media 200 and 210, respectively. A recording medium attachment/detachment detector 98 detects whether the recording media 200 and 210 are mounted onto the connectors 92 and 96, respectively.

A communication unit 110 has a communication function based on Recommended Standard 232 version C (RS-232C), Universal Serial Bus (USB), Institute of Electrical and Electronics Engineers (IEEE) 1394, wireless communication, and the like. A connector 112 connects the camera main body 100 to other devices via the communication unit 110. When wireless communication is executed, an antenna is connected to the communication unit 110.

The recording media 200 and 210 respectively include interfaces 204 and 214 configured to communicate with the camera main body 100 and connectors 206 and 216 configured to be electrically connected to the camera main body 100. Compressed image data output from the camera main body 100 is written into the recording units 202 and 212.

In the shooting lens 220, a shooting lens group 1 includes a plurality of lenses, namely a focus lens configured to move in an optical axis for focus adjustment, and a zoom lens configured to move in the optical axis for zooming. The diaphragm 224 adjusts a light amount of light flux incident to the image sensor 5. An imaging optical system includes the shooting lens group 1 and the diaphragm 224.

A lens driving circuit 226 controls an actuator (not illustrated) configured to drive the focus lens, the zoom lens, and the diaphragm 224, according to a control signal from the system control unit 50. The lens driving circuit 226 has a memory function of storing constants and variables and programs for a shooting lens operation. Additionally, the lens driving circuit 226 has a function serving as a nonvolatile memory for storing identification information, e.g., a shooting lens specific number, management information, functional information including a maximum aperture value, a minimum aperture value, and a focal distance, and current/ previous setting values.

The connector 228 is connected to a communication contact unit 41 of the camera main body 100 to enable communication between the lens driving circuit 226 and the system control unit 50. The connector 228 supplies the power supply voltage into the shooting lens 220 from the power supply 86.

FIGS. 2A to 2F illustrate setting screens concerning an ISO sensitivity (imaging sensitivity) displayed on the image display unit 28.

Figure 2A:
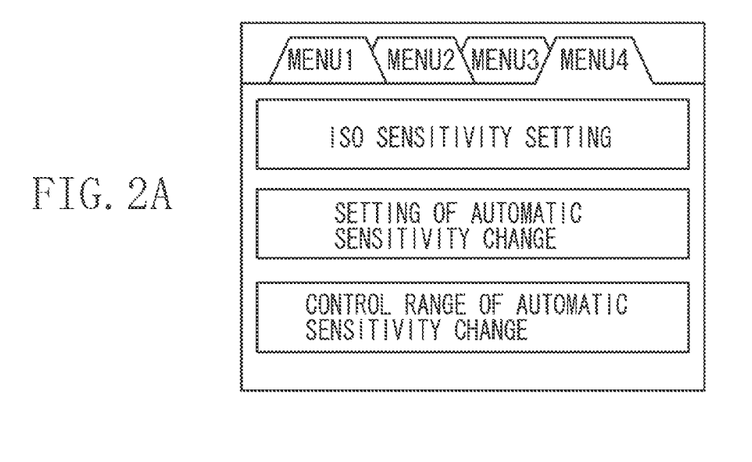
FIGS. 2A to 2F illustrate examples of setting screens relating to the imaging sensitivity.
Figure 2B:
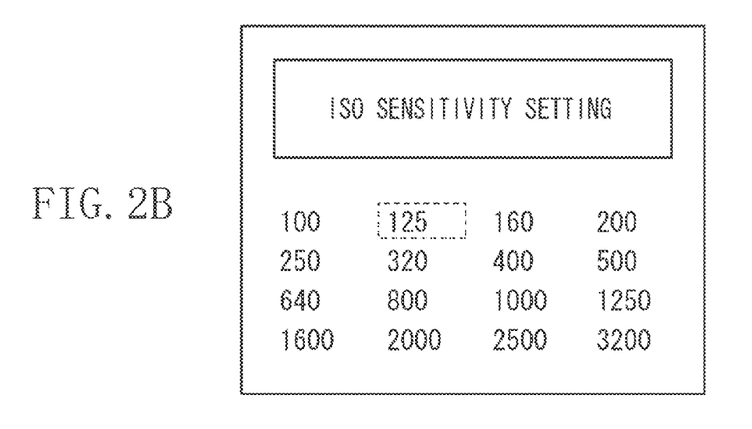

FIG. 2A illustrates a screen displaying a plurality of items concerning the ISO sensitivity, and when a user operates the operation unit 70, selection and determination of an arbitrary item are executed. When the user selects and determines an item "ISO sensitivity setting", a screen illustrated in FIG. 2B is displayed, so that the user can specify any ISO sensitivity from a plurality of displayed values as an ISO sensitivity used for image capturing. At this time, the ISO sensitivity set according to a user's instruction (also referred to as setting set sensitivity) is stored in an internal memory (not illustrated) by the system control unit 50. In the below description, executing various settings according to a user's instruction received by the operation unit 70 is referred to as just user's setting.

In the meantime, the screen illustrated in FIG. 2B is just an example of screens allowing a user to arbitrary set the ISO sensitivity, and the number of the ISO sensitivities which can be set and the value of the ISO sensitivity which can be set are not limited to those illustrated in FIG. 2B. Although FIG. 2B illustrates a display format for displaying a plurality of ISO sensitivities which can be set at the same time, a display format which displays only a single ISO sensitivity and changes the ISO sensitivity value in response to a user's operation of the operation unit 70 may be adopted. Further, the ISO sensitivity may be set by the user operating the operation unit 70 to input a desired ISO sensitivity. Instead of setting the ISO sensitivity via the menu screen illustrated in FIGS. 2A to 2F, the ISO sensitivity may be set by operating an operation member intended to set the ISO sensitivity.

Figure 2C:
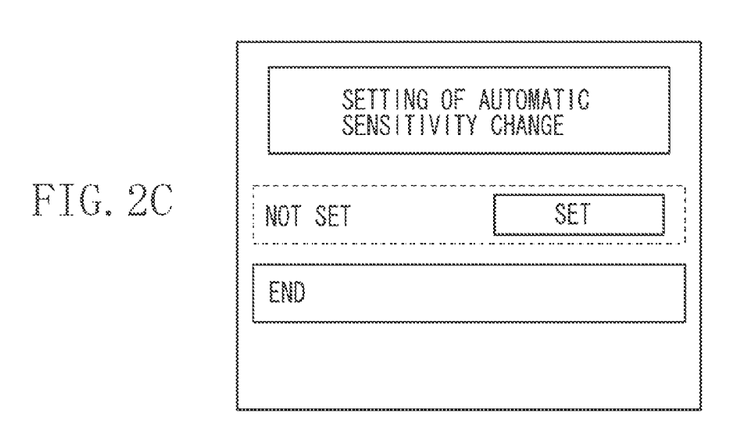
Figure 2D:
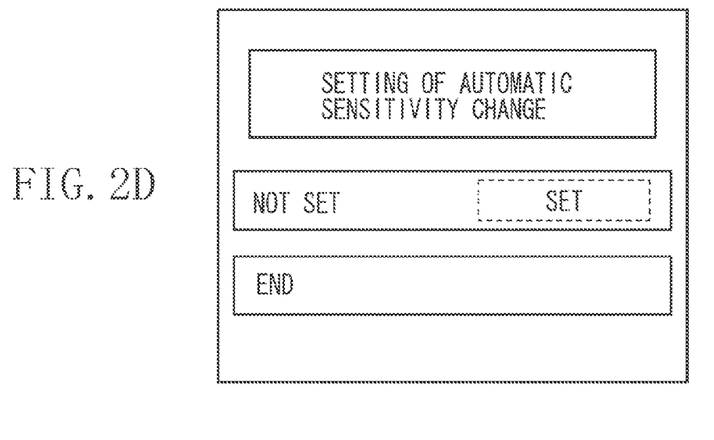

FIGS. 2C and 2D illustrate screens for selecting whether to set automatic sensitivity change. FIG. 2C is a screen which allows the user to select whether setting of the automatic sensitivity change is changed or whether setting of the automatic sensitivity change is finished, and a selected item is enclosed with a dotted line.

When the user determines to change the setting of automatic sensitivity change, the screen changes to a state illustrated in FIG. 2D, which allows the user to determine whether the automatic sensitivity change is executed.

The screens illustrated in FIGS. 2C and 2D are examples of screens for a user to set the automatic sensitivity change, and the user may set the automatic sensitivity change via different screens from those illustrated in FIGS. 2C and 2D. Alternatively, the automatic sensitivity change may be set by operating an operation member configured to set whether the automatic sensitivity change is enabled or not.

Figure 2E:
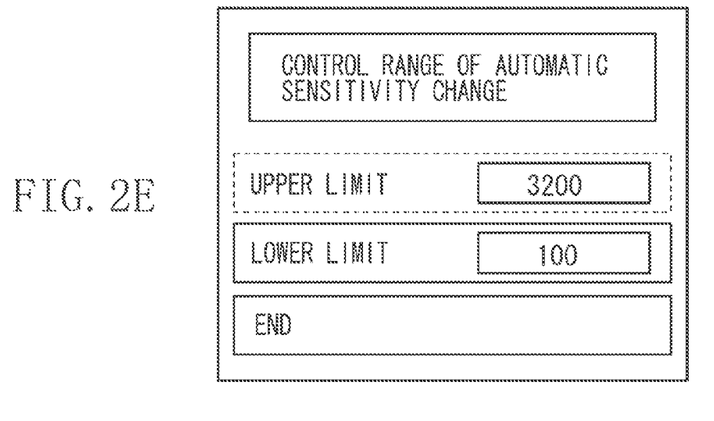
Figure 2F:
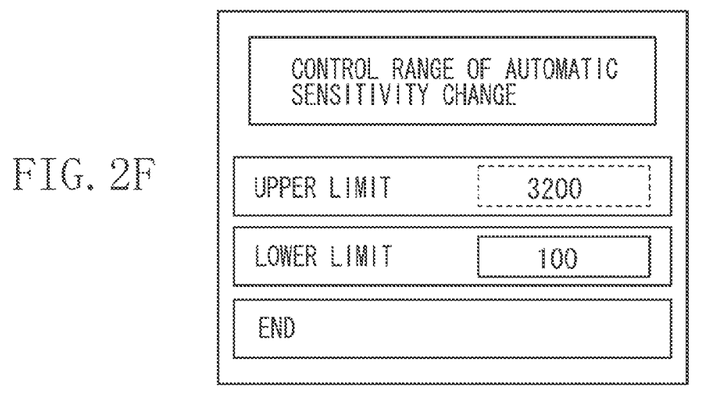

FIGS. 2E and 2F illustrate screens for a user to set a control range of the automatic sensitivity change (also referred to as a sensitivity control range). The screen illustrated in FIG. 2E allows a user to set an upper limit value and a lower limit value of the control range. When the user determines to set an upper limit value in the state illustrated in FIG. 2E, the screen is changed to a state illustrated in FIG. 2F, allowing the user to set the lower limit value. The upper limit value and the lower limit value of the control range used for the automatic sensitivity change, which are set as described above, are stored in the internal memory by the system control unit 50 as a set upper limit value and a set lower limit value.

According to the present exemplary embodiment, the upper limit value and the lower limit value which can be set in the screens illustrated in FIGS. 2E and 2F are independent of the ISO sensitivity which can be set in the screen illustrated in FIG. 2B. Thus, an ISO sensitivity exceeding the upper limit value and the lower limit value set in FIGS. 2E and 2F can be set in FIG. 2B. In other words, an ISO sensitivity can be set out of the control range of the automatic sensitivity change set by the user.

For example, even if a user sets the upper limit value of the control range of the automatic sensitivity change to "ISO 800", the user can set a higher sensitivity than "ISO 800", i.e., "ISO 3200". Likewise, even if the user sets the lower limit value of the control range of the automatic sensitivity change to "ISO 400", the user can set a lower ISO sensitivity than "ISO 400" to "ISO 100".

Regarding the setting of the control range of the automatic sensitivity change, a configuration which allows any one of the upper limit value and the lower limit value to be set may be adopted instead of a configuration which allows both the upper limit value and the lower limit value to be set. Alternatively, a configuration which allows an arbitrary range to be set from a plurality of preliminarily determined ranges as the control range may be adopted.

As described above, the user can set the ISO sensitivity out of the control range of the automatic sensitivity change set by the user as the ISO sensitivity for image capturing. Therefore, when the user wants to capture an image using the ISO sensitivity out of the control range of the automatic sensitivity change, the user can easily set the ISO sensitivity as desired. Consequently, time and labor required to set the desired ISO sensitivity are reduced, and the user can reduce a possibility of missing a photo opportunity.

Figure 3:
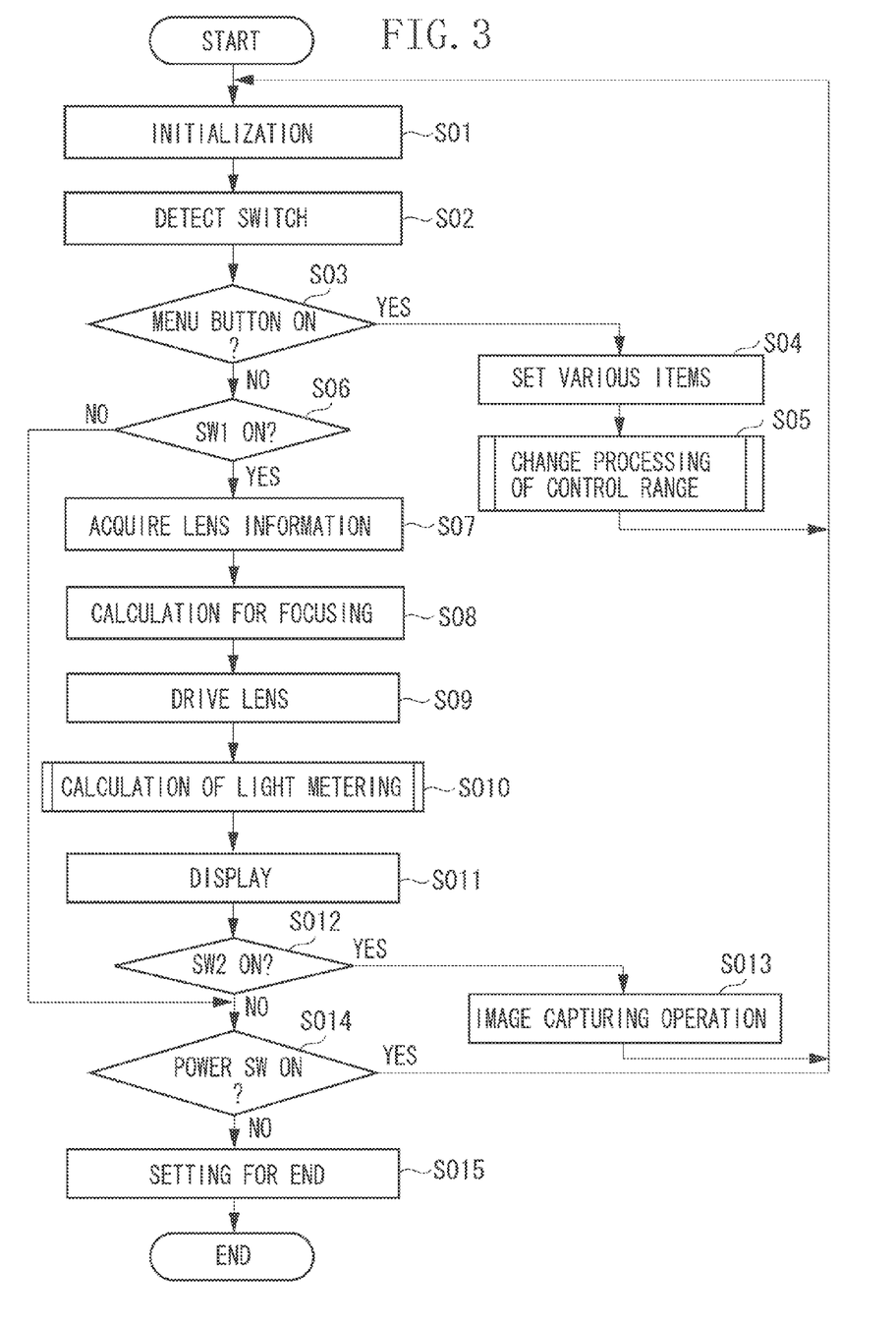
FIG. 3 is a flow chart illustrating various processing procedures performed by a camera.

FIG. 3 is a flow chart illustrating various processing procedures performed by the camera according to the present exemplary embodiment. The processing is executed mainly by the system control unit 50.

In step S01, the system control unit 50 executes initial setting including initialization of a register and initialization of data. In step S02, the system control unit 50 detects states of the mode dial 60, the shutter switch 62, and the operation unit 70.

In step S03, the system control unit 50 determines whether the menu button included in the operation unit 70 for executing various settings for the camera is pressed. When the menu button is pressed (YES in step S03), the processing proceeds to step S04. In step S04, the system control unit 50 sets various items concerning the ISO sensitivity based on an operation of the operation unit 70, and then, the processing proceeds to step S05. The setting method of various items concerning the ISO sensitivity will not be described here, because it is already described above with reference to FIG. 2.

Whereas if the menu button is not pressed (NO in step S03), the system control unit 50 advances the processing to step S06.

Figure 4:
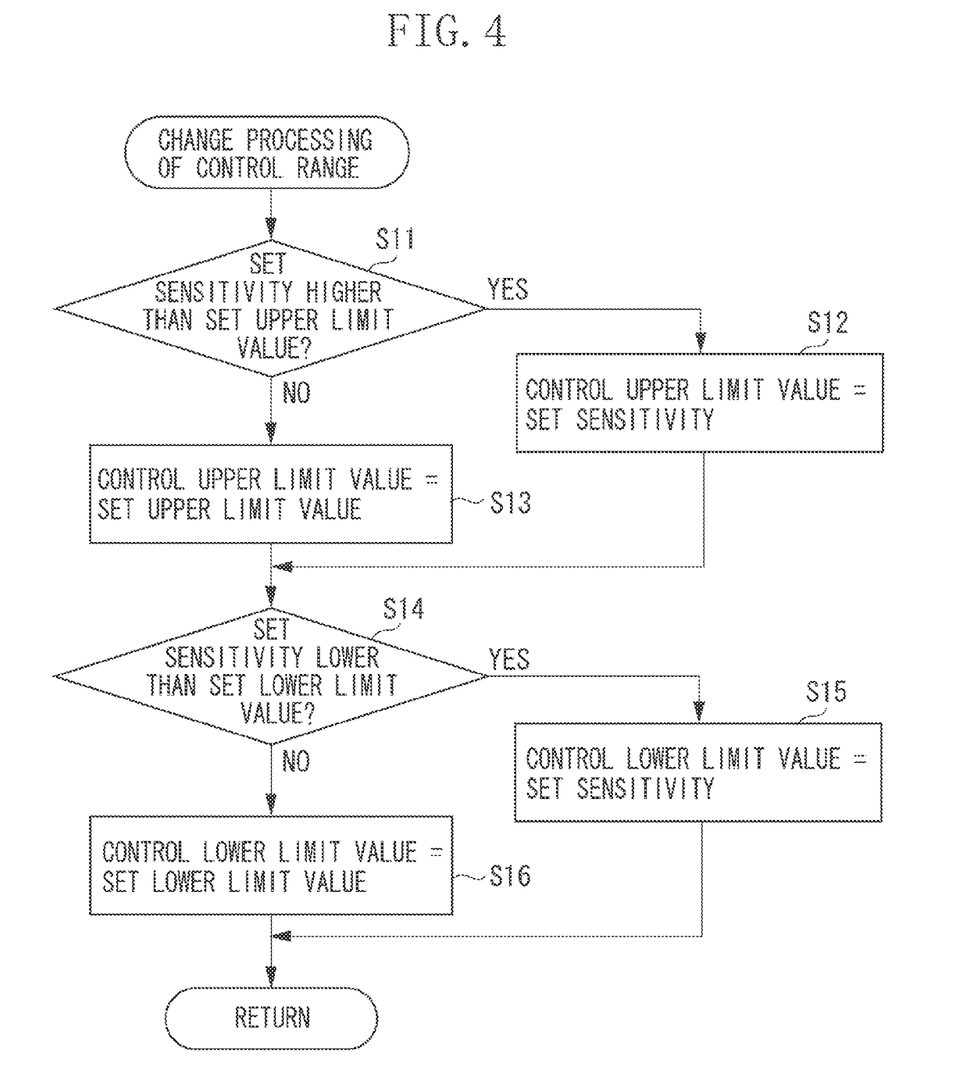
FIG. 4 is a flow chart illustrating a procedure for setting a control upper limit value and a control lower limit value for use in automatic sensitivity change of the camera.

In step S05, based on the set sensitivity, the set upper limit value and the set lower limit value which are set in step S04, the system control unit 50 sets a control upper limit value and a control lower limit value which are the upper limit value and lower limit value of the control range which are actually used for the automatic sensitivity change. With reference to FIG. 4, setting processing (change processing of the sensitivity control range used for the automatic sensitivity change) for the control upper limit value and the control lower limit value will be described below.

In step S11, the system control unit 50 compares the set sensitivity with the set upper limit value. As a result, if the set sensitivity is higher than the set upper limit value (YES in step S11), then in step S12, the system control unit 50 stores the set sensitivity in the internal memory as the control upper limit value. Then the processing proceeds to step S14. On the other hand, if the set sensitivity is not higher than the set upper limit value (NO in step S11), the processing proceeds to step S13.

In step S13, the system control unit 50 stores the set upper limit value in the internal memory as the control upper limit value. Then the processing proceeds to step S14.

In step S14, the system control unit 50 compares the set sensitivity with the set lower limit value. As a result, if the set sensitivity is lower than the set lower limit value (YES in step S14), then in step S15, the system control unit 50 stores the set sensitivity in the internal memory as the control lower limit value and terminates the setting processing for the control upper limit value and the control lower limit value. On the other hand, if the set sensitivity is not lower than the set lower limit value (NO in step S14), the processing proceeds to step S16.

In step S16, the system control unit 50 stores the set lower limit value in the internal memory as the control lower limit value and terminates the setting processing for the control upper limit value and the control lower limit value.

When the set sensitivity is out of the control range specified by the set upper limit value and the set lower limit value, the control range is changed so that the upper limit of the control range or the lower limit of the control range becomes the set sensitivity.

Accordingly, if a user sets a control range of the automatic sensitivity change and if the user can obtain no appropriate exposure in the condition that an imaging sensitivity out of the control range is set as an imaging sensitivity used for capturing images, the automatic sensitivity change can be executed smoothly.

If the set sensitivity is located between the set upper limit value and the set lower limit value (within the sensitivity control range), the set upper limit value and the set lower limit value are adopted as the control upper limit value and the control lower limit value. Thus, a sensitivity control range set by the user can be adopted as the control range actually used for the automatic sensitivity change, without any change. Thus, the automatic sensitivity change can be executed not to exceed user's intended range.

When the sensitivity set by the user after changing the sensitivity control range is within the sensitivity control range set by the user, it is possible to respect user's intention by bringing back the changed sensitivity control range to the sensitivity control range set by the user.

Returning to FIG. 3, in step S03, if the menu button is not pressed (NO in step S03), then in step S06, the system control unit 50 determines whether the SW1 is ON. If the SW1 is OFF (NO in step S06), the system control unit 50 advances the processing to step S014.

If the SW1 is ON (YES in step S06), then in step S07, the system control unit 50 reads various information pieces concerning the loaded shooting lens 220. When acquiring lens information from the shooting lens 220, the system control unit 50 communicates with the shooting lens 220 to acquire the lens information of the shooting lens 220. The lens information includes lens specific information, a focal distance, an aperture value, a focus lens position, and the like.

In step S08, the system control unit 50 executes range-finding calculation based on a known phase difference detection method to focus on an object. In step S09, the system control unit 50 calculates a lens driving amount based on data (i.e., defocus amount) introduced by the range-finding calculation in step S08 and drives the lens.

In step S010, based on camera setting information such as an output from the light metering circuit 42 and an image capturing mode, the system control unit 50 executes light metering calculation to determine exposure control values such as an aperture value, a shutter speed, ISO sensitivity used for imaging.

Figure 5:
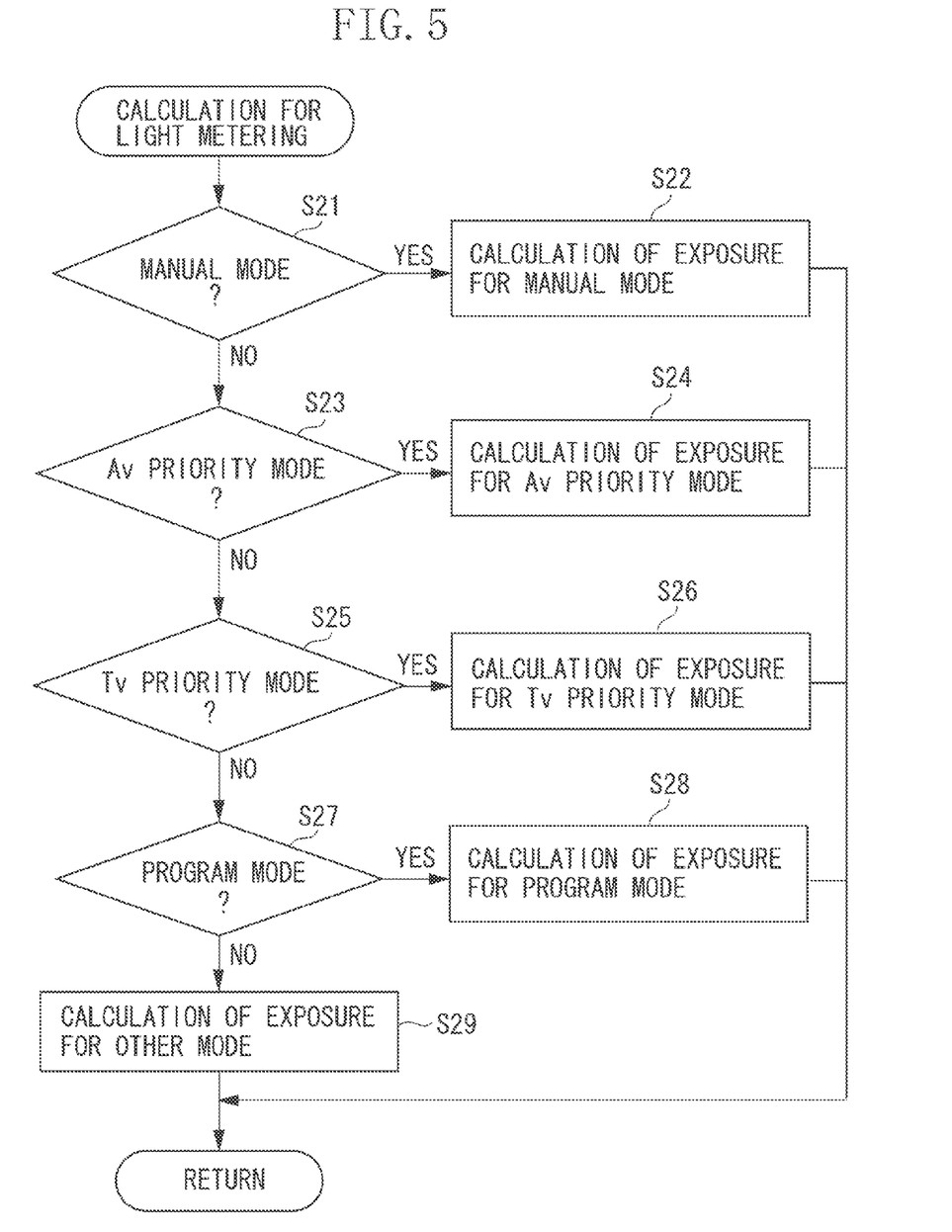
FIG. 5 is a flow chart illustrating a procedure for calculation processing of light metering of the camera.

FIG. 5 is a flow chart illustrating a procedure for the light metering calculation in step S010.

In step S21, the system control unit 50 determines whether the manual mode is set using the mode dial 60. If the manual mode is set (YES in step S21), then in step S22, the system control unit 50 calculates an exposure based on the shutter speed or the aperture value set by the user.

On the other hand, if the manual mode is not selected as a result of the determination (NO in step S21), in step S23, the system control unit 50 determines whether the aperture priority (Av priority) mode is selected. If the Av priority mode is selected (YES in step S23), in step S24, the system control unit 50 calculates an exposure for the Av priority mode.

Figure 6:
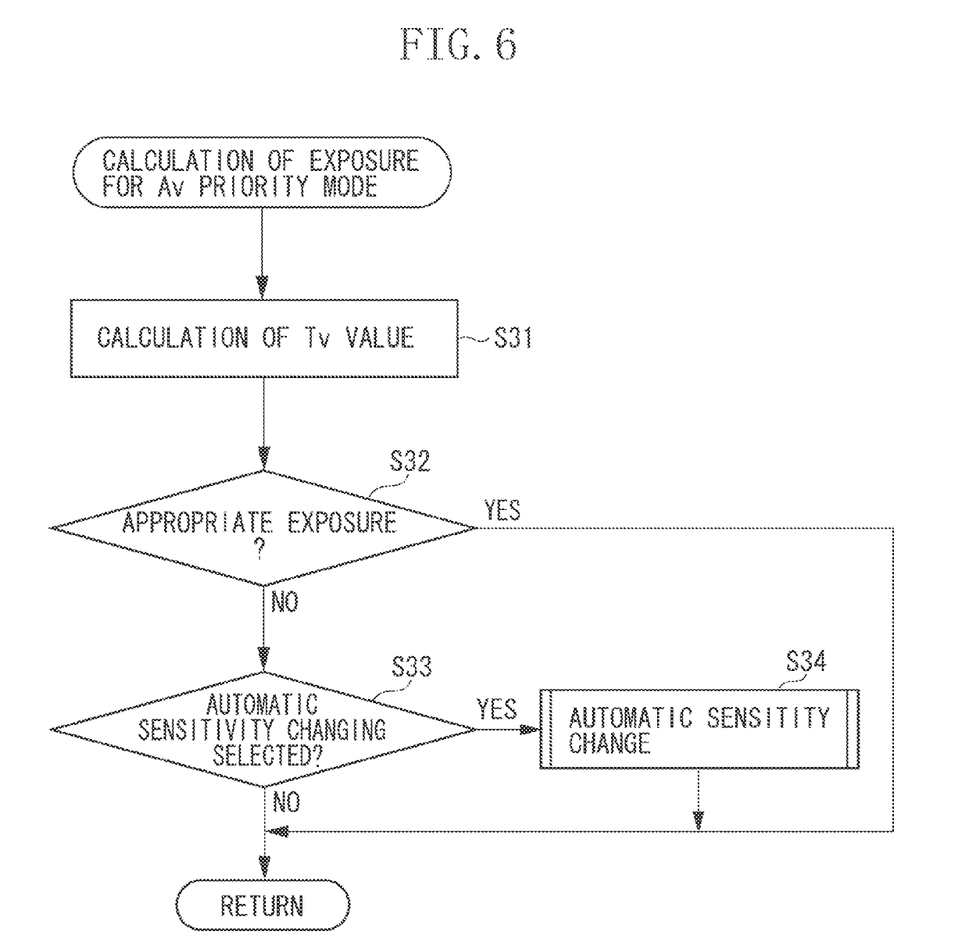
FIG. 6 is a flow chart illustrating a procedure for calculation processing of an exposure for an Av priority mode of the camera.

FIG. 6 is a flow chart illustrating a procedure for calculation of an exposure for the Av priority mode in step S24. In step S31, the system control unit 50 calculates a shutter speed (Tv) used for image capturing according to the aperture value and the ISO sensitivity set by the user and luminance information obtained from the light metering circuit 42.

In step S32, the system control unit 50 determines whether the exposure is appropriate according to the luminance information and a calculation result in step S31. If the exposure is appropriate (YES in step S32), the system control unit 50 terminates the processing in FIG. 6 and returns to the original processing. On the other hand, if the exposure is not appropriate (NO in step S32), the processing proceeds to step S33.

In step S33, the system control unit 50 determines whether an item "set" is selected for the automatic sensitivity change. If the item "SET" is selected for the automatic sensitivity change (YES in step S33), the processing proceeds to step S34. Whereas if not (NO in step S33), the system control unit 50 terminates the processing in FIG. 6 and returns to the original processing.

In step S34, the system control unit 50 proceeds to automatic sensitivity change processing to change the set sensitivity to bring the exposure close to an appropriate value.

Figure 7:
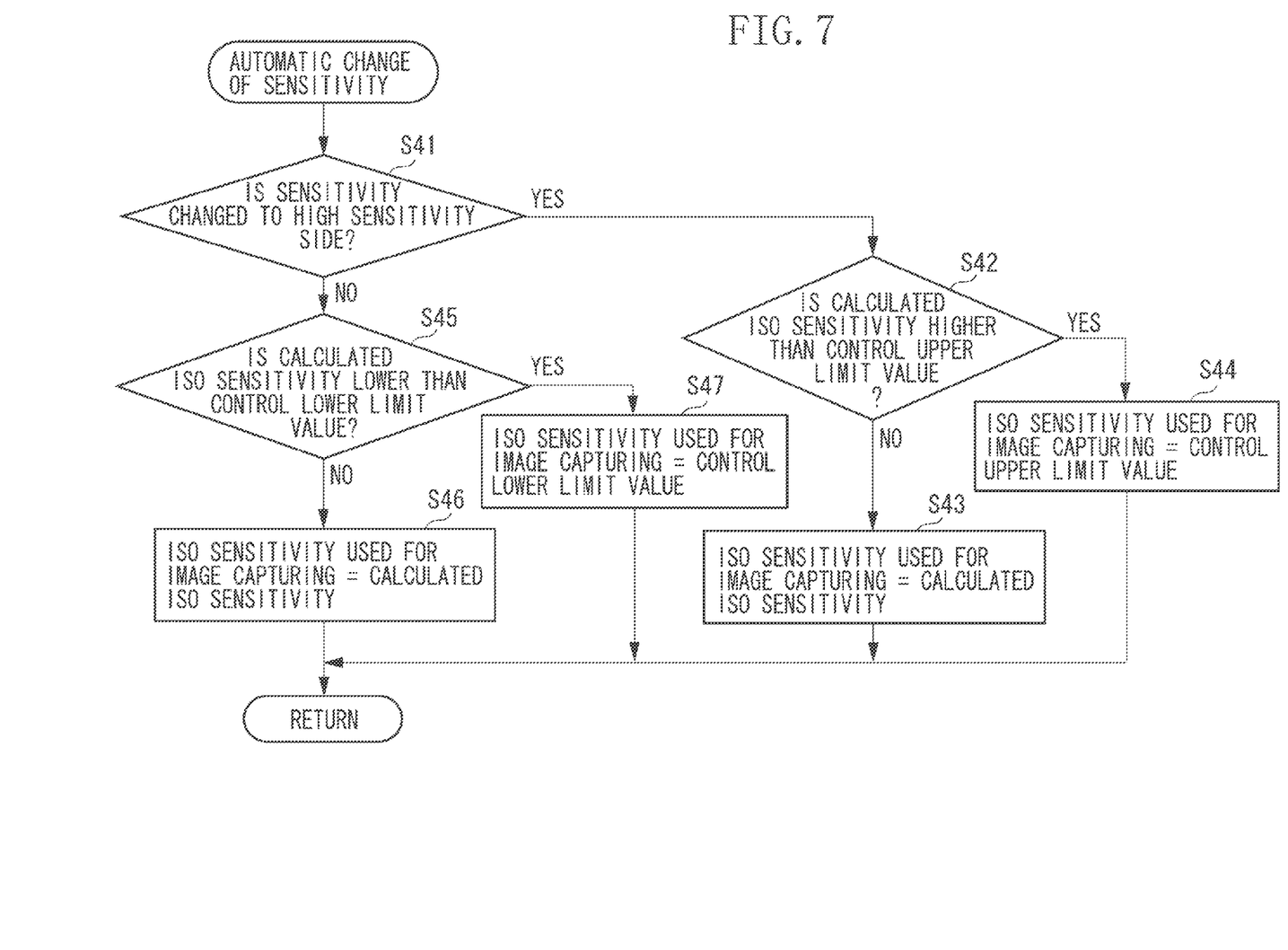
FIG. 7 is a flow chart illustrating a procedure for automatic sensitivity changing processing of the camera.

FIG. 7 is a flow chart illustrating a procedure for the automatic sensitivity change processing in step S34.

In step S41, the system control unit 50 calculates the ISO sensitivity which ensures the appropriate exposure according to the luminance information and the calculation result in step S31, and determines to which side the set sensitivity to be changed to bring the exposure close to the appropriate one. If the set sensitivity is changed to a high sensitivity side (YES in step S41), the processing proceeds to step S42, and if it is changed to a low sensitivity side (NO in step S41), the processing proceeds to step S45.

In step S42, the system control unit 50 compares the calculated ISO sensitivity with the control upper limit value. If the calculated ISO sensitivity is not higher than the control upper limit value (NO in step S42), the processing proceeds to step S43. In step S43, the system control unit 50 determines the calculated ISO sensitivity as the ISO sensitivity used for image capturing. Then, the processing returns to the original processing.

On the other hand, if the calculated ISO sensitivity is higher than the control upper limit value (YES in step S42), the processing proceeds to step S44. In step S44, the system control unit 50 determines the control upper limit value as the ISO sensitivity used for image capturing. Then, the processing returns to the original processing.

In step S45, the system control unit 50 compares the calculated ISO sensitivity with the control lower limit value. If the calculated ISO sensitivity is not lower than the control lower limit value (NO in step S45), the processing proceeds to step S46. In step S46, the system control unit 50 determines the calculated ISO sensitivity as the ISO sensitivity used for image capturing. Then, the processing returns to the original processing.

On the other hand, if the calculated ISO sensitivity is lower than the control lower limit value (YES in step S45), the processing proceeds to step S47. In step S47, the system control unit 50 determines the control lower limit value as the ISO sensitivity used for image capturing. Then, the processing returns to the original processing.

Returning to FIG. 5, if the Av priority mode is not selected as a result of the determination (NO in step S23), in step S25, the system control unit 50 determines whether the shutter speed priority (Tv priority) mode is selected. If the Tv priority mode is selected (YES in step S25), then in step S26, the system control unit 50 calculates the exposure for the Tv priority mode.

The procedure for calculation of the exposure for the Tv priority mode is different from the procedure for calculation for the Av priority mode illustrated in FIG. 6 in only step S31, and in the calculation processing of the exposure for the Tv priority mode, the aperture value (Av) used for image capturing is calculated. When the calculation processing of the exposure for the Tv priority mode is completed, the processing returns to the original one.

Returning to FIG. 5, if the Tv priority mode is not selected as a result of the determination (NO in step S25), in step S27, the system control unit 50 determines whether program mode is selected. If program mode is selected (YES in step S27), in step S28, the system control unit 50 calculates the exposure for the program mode.

The procedure for calculation of the exposure for the program mode is different from the procedure for calculation of the exposure for the Av priority mode illustrated in FIG. 6 in only step S31, and in the calculation processing of the exposure for the program mode, the aperture value (Av) and the shutter speed (Tv) used for image capturing are calculated. When the calculation processing of the exposure for the program mode is completed, the processing returns to the original one.

Returning to FIG. 5, if the program mode is not selected as a result of the determination (NO in step S27), in step S29, the system control unit 50 determines that an image capturing mode other than the above-described ones is selected and executes the calculation processing for light metering for the other mode. When the processing is completed, the processing returns to the original one.

Returning to FIG. 3, after performing the light metering calculation in step S010, then in step S011, the system control unit 50 displays on the image display unit 28 the camera information determined by the light metering calculation, such as the aperture value, the shutter speed, and the ISO sensitivity.

In step S012, the system control unit 50 determines whether the SW2 is ON. If the SW2 is ON (YES in step S012), in step S013, the system control unit 50 executes gain setting, an accumulation operation, and a reading operation of the image sensor 5, which are known operation, and executes an image capturing operation for still images such as image processing and image writing. Then, the system control unit 50 returns the processing to step S02.

On the other hand, if the SW2 is OFF (NO in step S012), in step S014, the system control unit 50 determines whether a power switch (not illustrated) is ON. If the power switch is ON (YES in step S014), the system control unit 50 returns the processing to step S02.

On the other hand, if the power switch is OFF (NO in step S014), in step S015, the system control unit 50 performs end settings such as issuance of instructions to various circuits to turn OFF power and to save data for terminating the processing. Then, the processing is terminated.

As described above, according to the present exemplary embodiment, a user can instruct a sensitivity control range used for executing the automatic sensitivity change and an imaging sensitivity used for image capturing independently. Consequently, if a user desires to capture an image at an imaging sensitivity out of the sensitivity control range used for the automatic sensitivity change specified by the user, the user can set a desired imaging sensitivity easily. As a result, time and labor required to set a desired imaging sensitivity are reduced, and the user can reduce a possibility of missing a photo opportunity.

Further, if a user sets a control range used for the automatic sensitivity change and if the user cannot obtain an appropriate exposure in the state in which an imaging sensitivity out of the set sensitivity control range is specified as an imaging sensitivity for image capturing, the user may change the control range. As a consequence, the automatic sensitivity changes can be executed smoothly.

Further, if an imaging sensitivity indicated by a user is within the sensitivity control range specified by the user, the imaging sensitivity is changed within the sensitivity control range specified by the user. Thus, the automatic sensitivity change can be executed not to exceed a range intended by the user.

Although in the above described exemplary embodiment, the configuration in which an interchangeable lens is mounted on the camera main body is described, the camera main body may be provided with a built-in shooting lens.

The image capturing apparatus according to the exemplary embodiment can execute exposure calculation based on not only a result of metering light using a light metering sensor or a light metering circuit but also a result of metering light using an image sensor.

Although the configuration in which no automatic sensitivity change is executed when the image capturing mode is the manual mode is described, the image capturing apparatus according to the exemplary embodiment can adopt a configuration which allows the automatic exposure change to be executed even when the manual mode is selected.

Further, the image capturing apparatus according to the exemplary embodiment may have not only a function of automatically changing the imaging sensitivity when no appropriate exposure is obtained under the sensitivity instructed by a user as described above, but also a function of automatically setting an imaging sensitivity capable of securing an appropriate exposure without setting the imaging sensitivity according to the user's instruction.

In a configuration including an exposure correction function capable of correcting a target exposure in the exposure control to a different exposure from the appropriate one according to a user's instruction, the automatic sensitivity change may be executed when the target exposure is not achieved under the imaging sensitivity instructed by the user.

Although, in the above described exemplary embodiment, the case where the imaging sensitivity is automatically changed is described, the imaging sensitivity is just an example of the exposure control value, and the present invention may be applied in case of automatically changing other exposure control value, such as the aperture value and the shutter speed. Even when the present invention is applied to other exposure control value than the imaging sensitivity, the system control unit 50 may control the exposure control value similar to the case of the imaging sensitivity.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-093241 filed Apr. 19, 2011, which is hereby incorporated by reference herein in its entirety.

What is claimed is:

1. An image capturing apparatus comprising:
   an image capturing unit configured to capture an image of an object;
   a light metering unit configured to perform light metering on the object;
   an exposure control value setting unit configured to set an exposure control value according to a first selecting operation in which a user selects an exposure control value;
   an exposure control value changing unit configured to change an exposure control value to be set by the exposure control value setting unit by selecting an exposure control value included in an exposure control value control range based on a result of the light metering by the light metering unit;
   a control range setting unit configured to set the exposure control value control range according to a second selecting operation in which a user selects at least one exposure control value; and
   a control range changing unit configured, in a case that the exposure control value set according to the first selecting operation is out of the exposure control value control range set according to the second selecting operation, to change the exposure control value control range set by the control range setting unit into a range including the exposure control value set by the exposure control value setting unit automatically without requiring a selecting operation in which a user selects an exposure control value, wherein the exposure control value control range is changed by controlling only one of an upper limit value of the exposure control value and a lower limit value of the exposure control value.

2. The image capturing apparatus according to claim 1, wherein, in a case that the exposure control value set by the exposure control value setting unit is within the exposure control value control range set by the control range setting unit, the control range changing unit does not change the exposure control value control range set by the control range setting unit.

3. The image capturing apparatus according to claim 1, wherein, in a case that the exposure control value set by the exposure control value setting unit is within the exposure control value control range set by the control range setting unit after the exposure control value control range set by the control range setting unit is changed, the control range changing unit brings back the changed exposure control value control range to the exposure control value control range set by the control range setting unit.

4. The image capturing apparatus according to claim 1, wherein, in a case that the exposure control value set by the exposure control value setting unit is out of the exposure control value control range set by the control range setting unit, the exposure control value changing unit changes the exposure control value set by the exposure control value setting unit by selecting an exposure control value included in an exposure control value control range changed by the control range changing unit.

5. The image capturing apparatus according to claim 1, wherein, in a case that the exposure control value set by the exposure control value setting unit is within the exposure control value control range set by the control range setting unit, the exposure control value changing unit changes the exposure control value set by the exposure control value setting unit by selecting an exposure control value included in the exposure control value control range set by the control range setting unit.

6. The image capturing apparatus according to claim 1, wherein, in a case that no target exposure is obtained under the exposure control value set by the exposure control value setting unit, the exposure control value changing unit changes the exposure control value set by the exposure control value setting unit.

7. The image capturing apparatus according to claim 1, wherein the exposure control value is an imaging sensitivity.

8. The image capturing apparatus according to claim 1, wherein the exposure control value is an aperture value.

9. The image capturing apparatus according to claim 1, wherein the exposure control value is a shutter speed.

10. A method for controlling an image capturing apparatus including an image capturing unit configured to capture an image of an object and a light metering unit configured to perform light metering on the object, the method comprising:
    setting an exposure control value according to a first selecting operation in which a user selects an exposure control value;
    changing the set exposure control value by selecting an exposure control value included in an exposure control value control range based on a result of light metering performed by the light metering unit;
    setting the exposure control value control range according to a second selecting operation in which a user selects at least one exposure control value; and
    changing, in a case that the exposure control value set according to the first selecting operation is out of the exposure control value control range set according to the second selecting operation, the set exposure control value control range into a range including the set exposure control value, wherein the exposure control value control range is changed by controlling only one of an upper limit value of the exposure control value and a lower limit value of the exposure control value.

* * * * *